Oct. 7, 1930.   O. K. A. WALLDEN   1,777,340
OILING DEVICE
Filed April 25, 1929
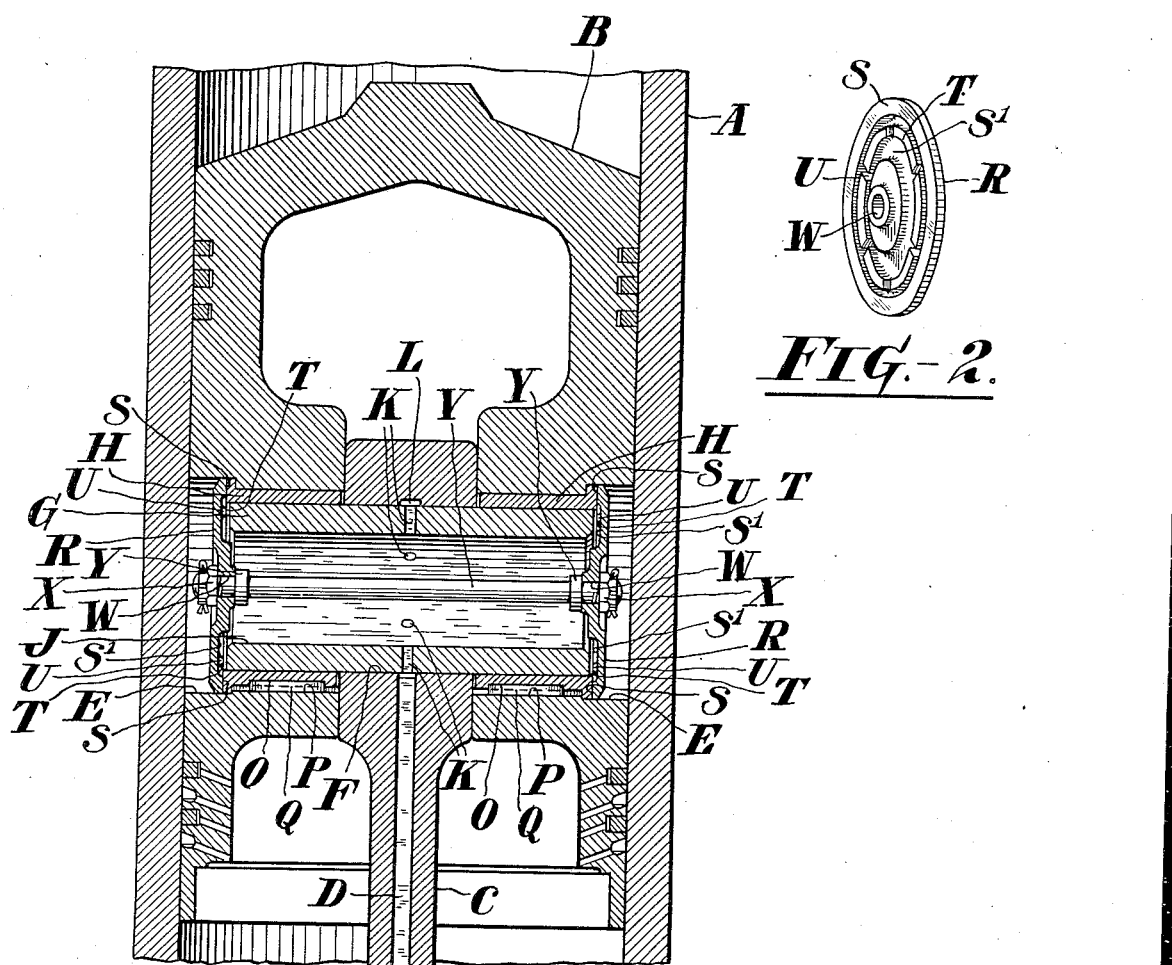
INVENTOR.
Osborne K A Wallden
BY
HIS ATTORNEY Patented Oct. 7, 1930

1,777,340

UNITED STATES PATENT OFFICE

OSBORNE K. A. WALLDEN, OF EASTON, PENNSYLVANIA, ASSIGNOR TO INGERSOLL-RAND COMPANY, OF JERSEY CITY, NEW JERSEY, A CORPORATION OF NEW JERSEY

OILING DEVICE

Application filed April 25, 1929. Serial No. 358,003.

This invention relates to reciprocatory engines, but more particularly to an oiling device for wrist pins connecting the piston rod to the piston of an engine of this type.

The object of the invention is to insure an ample supply of lubricant to the cooperating surfaces of the wrist pin and its bearings.

Other objects will be in part obvious and in part pointed out hereinafter.

In the drawings illustrating one form which the invention may assume in practice, Figure 1 is a sectional elevation of a cylinder and its piston in which the wrist pin is equipped with an oiling device constructed in accordance with the practice of the invention, and Figure 2 is a perspective view of an end plate.

Referring more particularly to the drawings, A designates a cylinder which may be that of an internal combustion engine and B is a piston reciprocable in the cylinder A. The piston B is provided with the usual connecting rod C which may be connected at its opposite end to a crank shaft (not shown) and has a passage D therethrough to communicate with a source of oil supply (not shown) under pressure as is customary in devices of this type.

The piston B and the connecting rod C have transverse bores E and F respectively for the reception of a wrist pin G whereby the connecting rod C is connected to the piston B. Preferably the bores E are of sufficiently large diameter to receive bushings H which serve as renewable bearing surfaces for the ends of the wrist pin G.

The wrist pin G may be of the full floating type having a sliding fit both in the bushings H and the bore F of the connecting rod and has a bore J which extends entirely therethrough to serve as a chamber for oil. Such oil may be admitted from the passage D into the chamber through ports K in the wrist pin. The ports K are in constant communication with an annular groove L in the connecting rod as is also the passage D.

The bushings H and the piston B may be provided with keyways O and P respectively to receive keys Q for holding the bushings H against rotation in the piston B.

Means are provided for forming closures for the ends of the chamber J and also to convey oil from the chamber to the cooperating surfaces of the wrist pin and the bushings H. These means are in the form of plates R having bearing surfaces S adapted to seat against the outer ends of the bushings H wherewith they cooperate to prevent leakage of oil from the chamber J.

In order to insure the delivery of oil over the entire ends of the cooperating surfaces of the bushings and the wrist pin, the plates R are provided with annnular grooves S' of such width that their inner diameters lie inside the diameter of the chamber J and have outer diameters somewhat larger than the diameter of the wrist pin. It will thus be seen that these grooves S' span the wall of the wrist pin G. In engines equipped with a free floating wrist pin G, this arrangement would permit of an excessive degree of longitudinal movement of the wrist pin. In order therefore to limit such movement of the wrist pin annular ribs T are formed on the plates R, in this instance in the grooves S', adjacent the ends of the wrist pin G and radial slots U are formed in the ribs T to at all times assure a plentiful supply of oil throughout the entire area of the grooves.

In the construction shown a common means is provided for clamping the plates in sealing relationship with the ends of the bushings H. This means comprises a bolt V which extends coaxially through the chamber J and through holes W in the plates R. The ends of the bolt V are threaded to receive nuts X for clamping the plates R in position.

In order to prevent undue flexion of the plates R when the nuts X are tightened on the bolt, said bolt is provided with shoulders Y which act as abutments for the central portions of the plates.

To the end that the fluid tight joint between the plates R and the bushings H may at all times remain intact irrespective of temperature changes which may take place in the wrist pin and the associated elements, the plates R are preferably of small cross sectional area so that they may flex whenever the elements against which they seat contract or expand. Likewise the bolt V is of small cross sectional area to permit of contraction and expansion thereof.

During the operation of the device, oil flows through the passage D in the connecting rod and into the annular groove L and thence through the ports K into the chamber J. With the oil under pressure the chamber J and the grooves S' will at all times be entirely filled with oil so that the entire ends of the cooperating surfaces of the wrist pin and the bushings H will be exposed to oil under pressure for lubricating these surfaces, while the cooperating surfaces of the wrist pin G and the bore F in the connecting rod will receive their supply of oil directly from the annular groove L.

From the foregoing description it will readily be seen that an ample supply of oil will be at all times provided for the exterior surface of the wrist pin and the cooperating surfaces of the adjacent elements, such as the bushings H and the connecting rod C. The chamber J will be adequately sealed against leakage of oil therefrom and at the same time the plates R, by seating against the bushings H, will also serve to maintain the bushings firmly in the operative position.

I claim:

1. An oiling device, comprising a wrist pin having a bore forming a chamber for oil, bearings for the wrist pin, means for supplying oil to the chamber, plates forming closures for the ends of the chamber and having passages for conveying oil from the chamber to the cooperating surfaces of the wrist pin and the bearings, and means for holding the plates fixedly in fluid tight engagement with the bearings.

2. An oiling device, comprising a wrist pin having a bore forming a chamber for oil, means for supplying oil to the chamber, bushings forming bearings for the wrist pin, plates seated against the bushings to form closures for the chamber and having passages for conveying oil from the chamber to the cooperating surfaces of the wrist pin and the bushings, and means for holding the plates in fluid tight engagement with the bushings and for holding the bushings against endwise movement.

3. An oiling device, comprising a wrist pin having a bore forming a chamber for oil, bearings for the wrist pin, means for supplying oil to the chamber, plates seated against the bearing to form closures for the ends of the chamber and having passages for conveying oil from the chamber to the cooperating surfaces of the wrist pin and the bearings, and means including a bolt and nuts for holding the plates in fluid tight engagement with the bearings.

4. An oiling device, comprising a wrist pin having a bore forming a chamber for oil, means for supplying oil to the chamber, bearings for the wrist pin, plates seating against the bearings to seal the ends of the chamber and having grooves for conveying oil from the chamber to the cooperating surfaces of the wrist pin and the bearings, ribs on the plates acting as stops to limit endwise movement of the wrist pin, and means including a bolt and nuts for clamping the plates into fluid tight engagement with the bearings.

5. An oiling device, comprising a wrist pin having a bore to form a chamber for oil, means for supplying oil to the chamber, bearings for the wrist pin, plates seating against the bearings to form closures for the ends of the chamber and having passages for conveying oil from the chamber to the cooperating surfaces of the bearings and the wrist pin, said plates being flexible, and a bolt extending through the chamber and the plates for holding said plates in sealing relationship with the bearings.

6. An oiling device, comprising a wrist pin having a bore to form a chamber for oil, means for supplying oil to the chamber, bearings for the wrist pin, flexible plates seating against the ends of the bearings to form closures for the ends of the chamber and having annular grooves for conveying oil from the chamber to the cooperating surfaces of the wrist pin and the bearings, a bolt for holding the plates in sealing relationship with the bearings, and shoulders on the bolts to act as abutments for the central portions of the plates.

In testimony whereof I have signed this specification.

OSBORNE K. A. WALLDEN.